United States Patent [19]

Wu

[11] Patent Number: 5,584,923
[45] Date of Patent: Dec. 17, 1996

[54] SURFACE MODIFIED CALCIUM CARBONATE COMPOSITION AND USES THEREFOR

[75] Inventor: Kuan-Ting Wu, Sandersville, Ga.

[73] Assignee: ECC International Inc., Atlanta, Ga.

[21] Appl. No.: 625,937

[22] Filed: Apr. 1, 1996

Related U.S. Application Data

[62] Division of Ser. No. 518,757, Aug. 24, 1995, Pat. No. 5,531,821.

[51] Int. Cl.[6] ................................................ C09C 1/02
[52] U.S. Cl. ........................ 106/464; 106/465; 162/181.1; 162/181.2; 162/181.3
[58] Field of Search ................................ 106/464, 465; 162/181.1, 181.2, 181.3

[56] References Cited

U.S. PATENT DOCUMENTS

| | | |
|---|---|---|
| 4,115,187 | 9/1978 | Davidson ........................ 162/181.1 |
| 4,242,318 | 12/1980 | Brahm et al. . |
| 4,610,801 | 9/1986 | Mathews et al. . |
| 5,000,791 | 3/1991 | Tokarz et al. ........................ 106/465 |
| 5,007,964 | 4/1991 | Tsukisaka et al. . |
| 5,043,017 | 8/1991 | Passaretti ........................ 106/464 |
| 5,156,719 | 10/1992 | Passaretti . |
| 5,164,006 | 11/1992 | Chapnerkar et al. . |
| 5,221,435 | 6/1993 | Smith, Jr. ........................ 162/181.3 |

*Primary Examiner*—Mark L. Bell
*Assistant Examiner*—Michael Marcheschi
*Attorney, Agent, or Firm*—Klauber & Jackson

[57] ABSTRACT

An improved form of calcium carbonate which is acid resistant to enable its use as a filler material in the making of neutral to weakly acid paper, and a process for producing this acid-resistant calcium carbonate is provided. This acid-resistant calcium carbonate comprises calcium carbonate in admixture with at least about 0.5 to about 10 percent, based on the dry weight of the calcium carbonate, of a cationic salt, together with at least about 0.5 to about 10 percent, based on the dry weight of the calcium carbonate, of an anionic salt.

5 Claims, 4 Drawing Sheets

SURFACE MODIFIED CALCIUM CARBONATE COMPOSITION AND USES THEREFOR

This application is a divisional of application Ser. No. 08/518,757, filed Aug. 24, 1995, now U.S. Pat. No. 5,531,821.

BACKGROUND OF THE INVENTION

This invention relates generally to calcium carbonate for use in papermaking, and related industries, and more particularly to a calcium carbonate having acid resistant properties.

Titanium dioxide and calcined clay have traditionally been utilized as filler materials in the preparation of neutral to weakly acidic paper in order to improve the optical properties, especially the brightness, of the resultant product. These materials, however, especially titanium dioxide, have the disadvantage of being very expensive, resulting in higher manufacturing costs and an uncompetitively priced paper product.

Calcium carbonate, particularly precipitated calcium carbonate, has been used as a filler material in the making of alkaline paper. Such usage results in a paper with enhanced optical properties, without the expense incurred in using titanium oxide fillers, resulting in a much less expensive product. Calcium carbonate, however, cannot generally be used as a filler in acidic paper because it decomposes in an acidic environment. Consequently, there has long been a need to develop a calcium carbonate composition which is acid stabilized and resistant to decomposition at low pH, so that it can be utilized as a filler material in the manufacture of acidic paper, such as groundwood paper, where the use of an alkaline filler would have a negative impact on the final paper properties.

U.S. Pat. No. 5,043,017 discloses and claims an acid-stable calcium carbonate resistant to degradation in a mildly acidic environment which comprises a mixture of a calcium-chelating agent or a conjugate base, and a weak acid such that calcium carbonate is coated by and is in equilibrium with the calcium-chelating agent or conjugate base and the weak acid. Preferred calcium carbonate compositions contain sodium hexametaphosphate and phosphoric acid.

U.S. Pat. No. 5,164,006 discloses and claims an acid resistant calcium carbonate which is prepared by preparing an aqueous slurry of calcium carbonate, heating the slurry to about 75°–80° C., slowing adding sodium silicate solution in an about of about 5–10% by weight, adding gaseous carbon dioxide, cooling the slurry and adding zinc chloride to the slurry to bring the pH to a range of about 7.5 to 8.0.

OBJECTS OF THE INVENTION

It is an object of the present invention to provide an acid resistant calcium carbonate composition especially suitable for use in papermaking applications.

It is a further object of the present invention to provide a process for the preparation of the aforesaid calcium carbonate compositions.

A still further object of the present invention is to provide a paper having enhanced optical qualities prepared using the calcium carbonate compositions of the present invention.

SUMMARY OF THE INVENTION

The present invention relates to an improved form of calcium carbonate which is acid resistant to enable its use as a filler material in the making of neutral to weakly acid paper, and a process for producing this acid resistant calcium carbonate. More particularly, this invention concerns an acid resistant calcium carbonate comprising a mixture of calcium carbonate with at least about 0.5 to about 10 percent, based on the dry weight of the calcium carbonate, of a cationic salt, together with at least about 0.5 to about 10 percent, based on the dry weight of the calcium carbonate, of an anionic salt. It has surprisingly been found that the inclusion of the both a cationic salt and an artionic salt with the calcium carbonate confers a higher degree of acid resistance for calcium carbonate in the presence of fiber slurry, and a longer term of low pH stability than untreated calcium carbonate compositions.

DETAILED DESCRIPTION OF THE INVENTION

Figure 1:
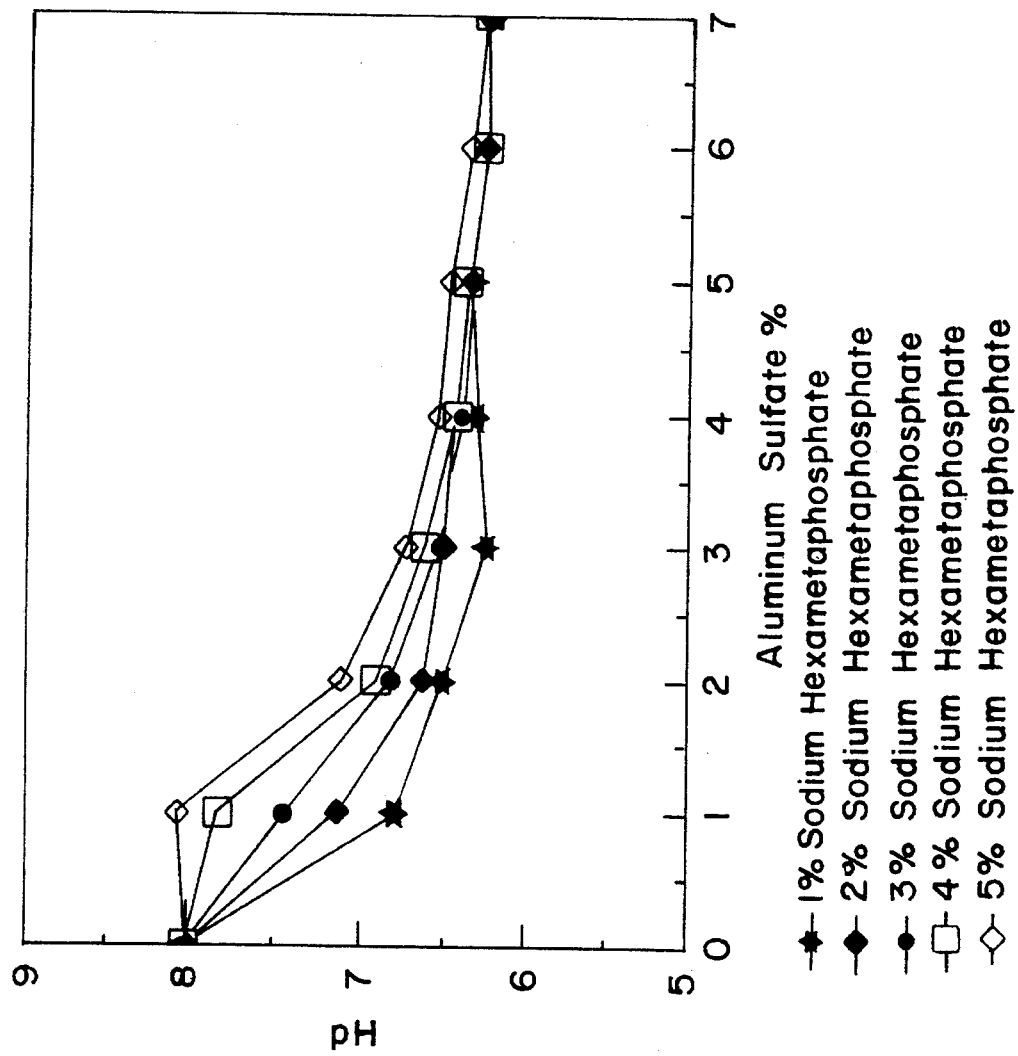
FIG. 1 is a graph showing the 24 hour aging of ground calcium carbonate compositions of the present invention using various concentrations of sodium hexametaphosphate and aluminum sulfate.

The improved form of calcium carbonate prepared by the instant invention is acid resistant to enable its use as a filler material in the making of neutral to weakly acid paper. While not wishing to be bound by any particular theory as to the operability of the present invention, it is believed that the acid resistance conferred upon the calcium carbonate compositions of the present invention is a result of the inactivation of the surface of the calcium carbonate by the addition of the weak base and the weak acid.

In the practice of the present invention, the calcium carbonate compositions are rendered acid resistant by the inclusion of at least about 0.5 to about 10 percent, based on the dry weight of the calcium carbonate, of a cationic salt together with at least about 0.5 to about 10 percent, based on the dry weight of the calcium carbonate, of an anionic salt.

The cationic salt utilized in the compositions of the present invention is typically an aluminum salt. Included are salts such as aluminum ammonium sulfate, aluminum potassium sulfate, chromium potassium sulfate, aluminum chloride, polyaluminum chloride and chromium ammonium sulfate. Preferably, aluminum sulfate, aluminum chloride, and polyaluminum chloride are utilized as the cationic salt.

The amount of the cationic salt utilized is at least 0.5 percent to about 10 percent, based on the dry weight of the calcium carbonate, and is preferably about 2 to about 7 percent, based on the dry weight of calcium carbonate.

The anionic salt utilized in the compositions of the present invention are salts of weak bases such as salts of hexametaphosphoric acid, salts of an organic polymeric acid, salts of acetic acid, salts of oxalic acid, salts of phosphoric acid, salts of metaphosphoric acid, salts of citric acid, salts of boric acid, salts of sulfurous acid, salts of ethylenediamine tetraacetic acid (EDTA), salts of polymaleic acid, salts of polycarboxylic acid, and mixtures thereof. Preferred anionic salts are sodium hexametaphosphate, sodium polyacrylate and sodium polymaleate.

The amount of the anionic salt utilized is at least 0.5 percent to about 10 percent, based on the dry weight of the calcium carbonate, and is preferably about 1 to about 5 percent, based on the dry weight of calcium carbonate.

The calcium carbonate utilized is preferably finely divided and it can be either a precipitated calcium carbonate or a natural ground limestone.

The process for producing this acid resistant calcium carbonate is much simpler than the process described by the aforementioned U.S. Pat. No. 5,164,006, and involves first forming a mixture of calcium carbonate with at least about 0.5 to about 10 percent, based on the dry weight of the calcium carbonate, of the anionic salt to be utilized. Then, at least about 0.5 to about 10 percent, based on the dry weight of the calcium carbonate, of the desired cationic salt is added to this resultant mixture. Finally, the resultant mixture is blended for a sufficiently long period of time to ensure uniform mixing of the ingredients.

The calcium carbonate can be utilized in the above-described process either as a dry powder or an aqueous slurry with up to about 60 percent by weight solids content.

The cationic salt can be utilized in the instant process either as a dry solid or and an aqueous solution. When the calcium carbonate is used in dry powder form, it is preferable to utilize an aqueous solution of the weak base in order to facilitate homogeneous mixing. Where a slurry of the calcium carbonate is utilized, the solid form of the cationic salt readily dissolves therein so that an aqueous solution is unnecessary.

The anionic salt can be utilized in the process of preparation in either a pure concentrated form or as an aqueous solution.

The composition of the present invention can be utilized to improve the optical properties of neutral to weakly acidic paper by its addition to the paper during standard manufacturing processes. Typically, the calcium carbonate composition of the present invention is added to a first paper furnish containing components necessary for making acidic paper to thereby form a second paper furnish. The invention will be further illustrated by the following Examples, which are to be considered illustrative of the invention, and not limited to the precise embodiments shown.

EXAMPLE 1

Ground Calcium Carbonate Composition

Acid resistant ground calcium carbonate slurry can be obtained by the addition of a anionic salt such as sodium hexametaphosphate, and a cationic salt such as aluminum sulfate. Initially, 1–5% sodium hexametaphosphate, based on the dry weight of calcium carbonate, was added into a slurry of ground calcium carbonate having an initial pH of 8.01. After mixing, 1–7% aluminum sulfate, based on the dry weight of the calcium carbonate, was added. A plot of the pH was measured for each sample after 24 hours ageing, and the results are shown in the graph shown in FIG. 1. From FIG. 1, the line connecting the oval points indicates that the calcium carbonate slurry prepared from 1% sodium hexametaphosphate, based on the dry weight of calcium carbonate, and 3% alum, based on the dry weight of calcium carbonate, resulted in a product that had a pH of 6.24 after 24 hours ageing.

EXAMPLE 2

Ground Calcium Carbonate Composition

Figure 2:
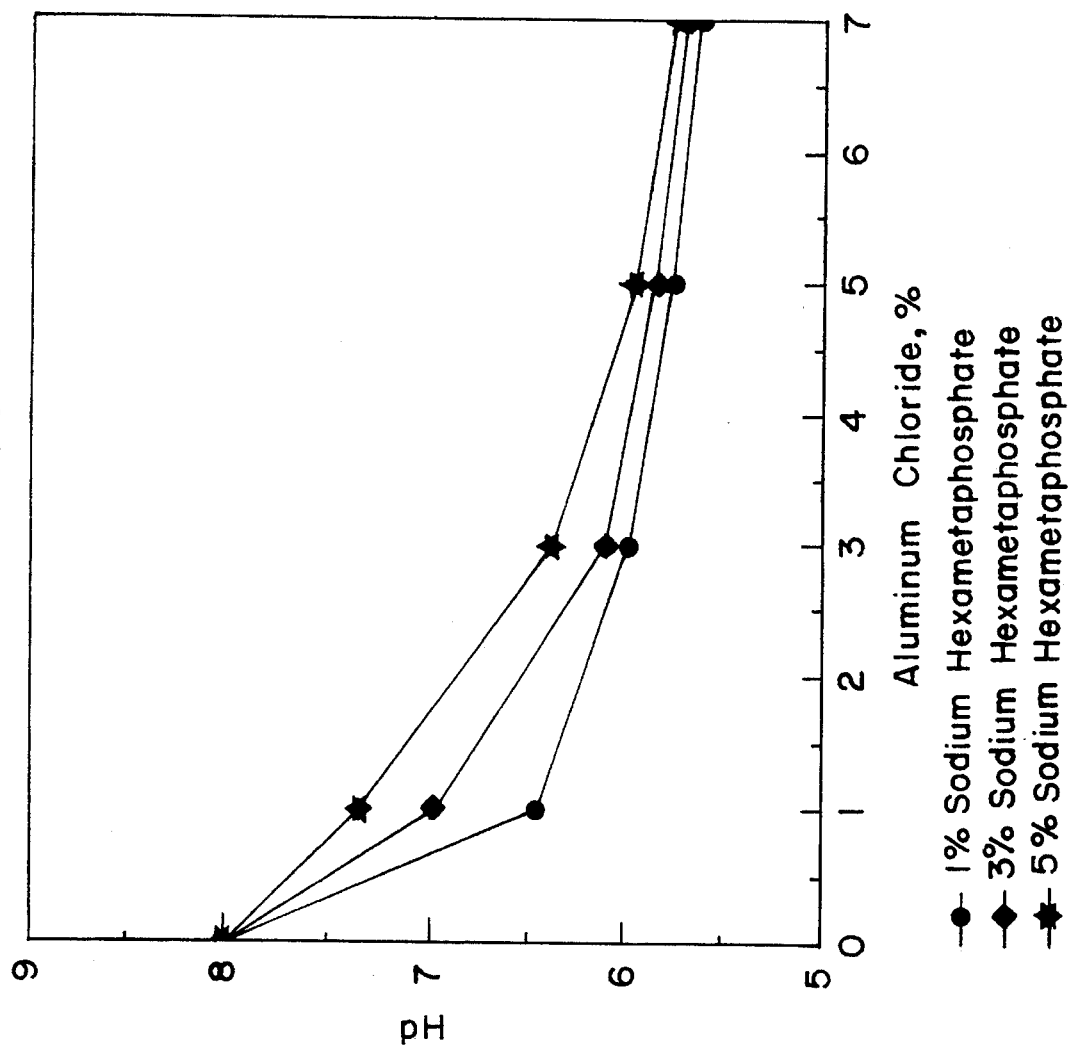
FIG. 2 is a graph showing the 24 hour aging of ground calcium carbonate using various concentrations of sodium hexametaphosphate and aluminum chloride.
Figure 3:
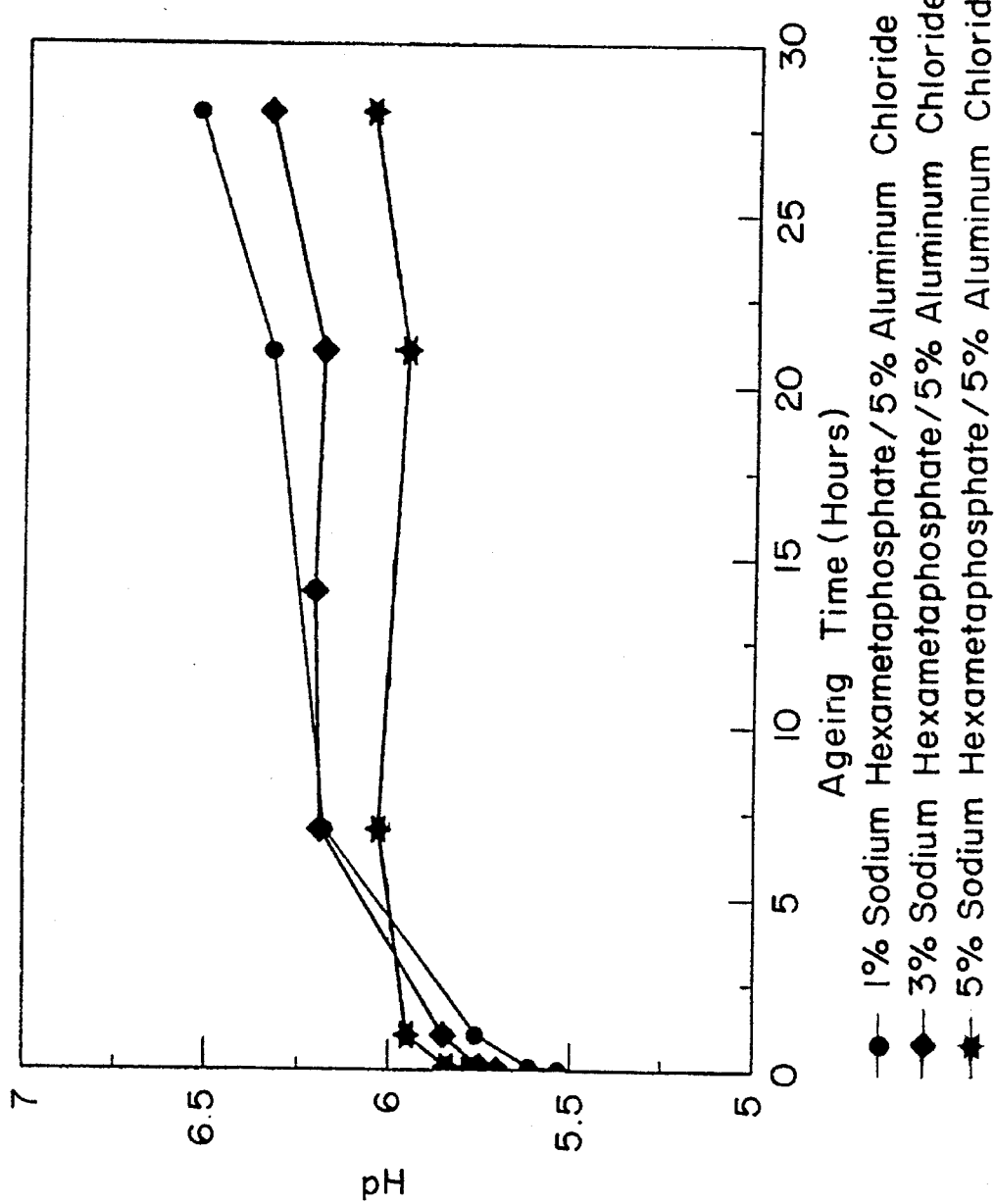
FIG. 3 is a graph showing the aging of ground calcium carbonate using various concentrations of sodium hexametaphosphate and aluminum chloride.

Acid stabilized ground calcium carbonate slurry can alio be produced by charge neutralization coating with aluminum chloride and sodium hexametaphosphate. The pH of ground calcium carbonate slurry is 8.01. At the beginning, 1%, 3% and 5% sodium hexametaphosphate, based on the dry weight of calcium carbonate, was added, followed by the addition of 5% aluminum chloride, based on the dry weight of calcium carbonate. A plot of pH was measured for each sample after 24 hours ageing as shown in FIG. 2 and FIG. 3. From the results, 2% sodium hexametaphosphate, based on the dry weight of calcium carbonate, was added. After blending, 5% aluminum was added, based on the dry weight of calcium carbonate. Initially, the pH of ground calcium carbonate slurry was 5.70 and resulted in a stable pH which was 5.85 after 24 hours ageing.

EXAMPLE 3

Ground Calcium Carbonate Composition

The pH of ground calcium carbonate slurry is 8.01. First, three percent sodium polyacrylate, based on the dry weight of calcium carbonate, was added, followed by the addition of 5% polyaluminum chloride, based on the dry weight of calcium carbonate. Initially, the pH of ground calcium carbonate slurry was 6.12 and resulted in a stable pH which was 6.60 after 116 hours ageing.

EXAMPLE 4

Scalenohedral Precipitated Calcium Carbonate Composition

Figure 4:
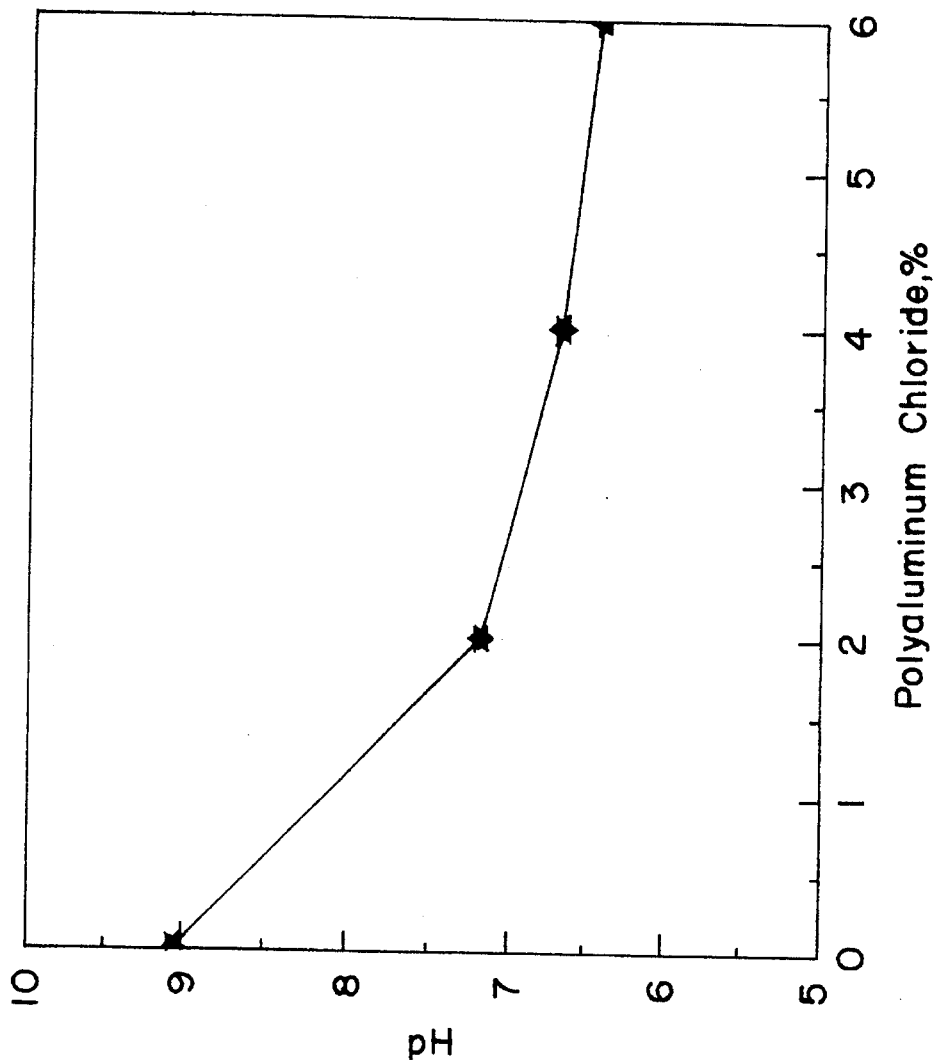
FIG. 4 is a graph showing the aging of scalenohedral precipitated calcium carbonate using sodium polyacrylate and various concentrations of polyaluminum chloride.

Acid stabilized scalenohedral calcium carbonate slurry can also be produced by charge neutralization coating with aluminum chloride and sodium polyacrylate. The pH of scalenohedral calcium carbonate slurry is 9.05. Initially, 1% sodium polyacrylate, based on the dry weight of calcium carbonate, was added, followed by the addition of 2%, 4% and 6% polyaluminum chloride, based on the dry weight of calcium carbonate. A plot of pH was measured for each sample after 24 hours ageing as shown in FIG. 4. From the results, the pH of scalenohedral precipitated calcium carbonated slurry was 6.02 with the treatment of 1% sodium polyacrylate/6% polyaluminum chloride, based on the dry weight of calcium carbonate, and the final pH of the slurry was found to be 6.44 after 68 hours ageing.

EXAMPLE 5

Rhombic Precipitated Calcium Carbonate Composition

Acid resistant rhombic precipitated calcium carbonate slurry can be obtained by the addition of a anionic salt such as sodium polyacrylate, and a cationic salt such as aluminum sulfate. Initially, 2% sodium polyacylate, based on the dry weight of calcium carbonate, was added into a slurry of rhombic precipitated calcium carbonate having an initial pH of 8.09. After mixing, 4% aluminum sulfate, based on the dry weight of the calcium carbonate, was added. Initially, the pH of this composition was 6.41, and after 24 hours ageing, the pH was found to be 6.59.

What is claimed is:

1. A process for the preparation of an acid resistant calcium carbonate which comprises:

a) forming a mixture of calcium carbonate with at least about 0.5 percent to about 10 percent, based on the dry weight of the calcium carbonate, of a cationic salt;

b) adding at least about 0.5 percent to about 10 percent, based on the dry weight of the calcium carbonate, of anionic salt to the mixture to form a final mixture; and c) blending the final mixture to ensure uniform mixing.

2. The process according to claim 1 wherein the anionic salt is sodium hexametaphosphate.

3. The process according to claim 1 wherein the cationic salt is aluminum sulfate.

4. The process according to claim 1 wherein the cationic salt is present in an mount of about 2 to about 7 percent, based on the dry weight of the calcium carbonate.

5. The process according to claim 1 wherein the anionic salt is present in an amount of about 1 to about 5 percent, based on the dry weight of the calcium carbonate.

* * * * *